J. & A. DEY.
TIME RECORDER.
APPLICATION FILED JUNE 15, 1905.
908,975.
Patented Jan. 5, 1909.
3 SHEETS—SHEET 1.
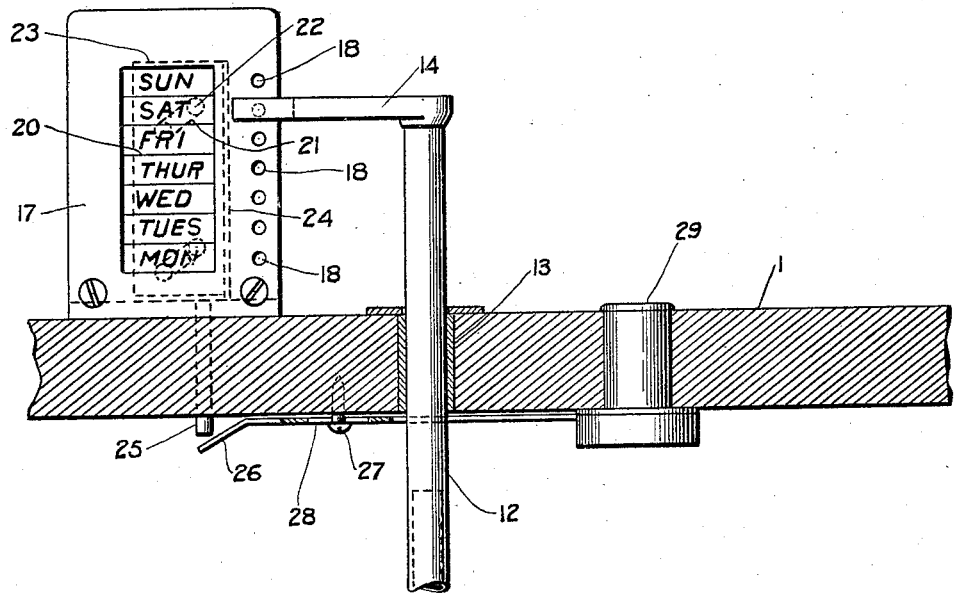
Fig. 1.
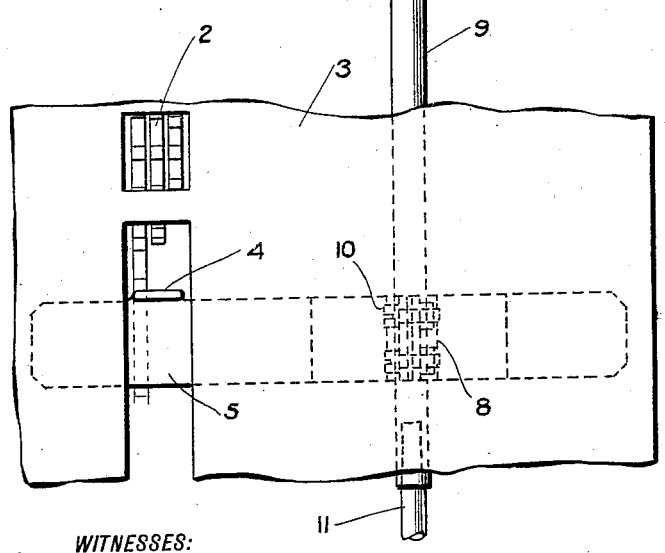
WITNESSES:
J. Clyde Ripley.
Charles H. Wilson.
INVENTORS
John Dey
Alexander Dey
BY
Warfield & Duell.
ATTORNEYS
THE NORRIS PETERS CO., WASHINGTON, D. C.

J. & A. DEY.
TIME RECORDER.
APPLICATION FILED JUNE 15, 1905.

908,975.

Patented Jan. 5, 1909.
3 SHEETS—SHEET 2.

WITNESSES:
J. Clyde Ripley.
Charles H. Wilson

INVENTORS
John Dey
Alexander Dey
BY
Warfield & Duell
ATTORNEYS

THE NORRIS PETERS CO., WASHINGTON, D. C.

J. & A. DEY.
TIME RECORDER.
APPLICATION FILED JUNE 15, 1905.

908,975.

Patented Jan. 5, 1909.
3 SHEETS—SHEET 3.

WITNESSES:

INVENTORS
John Dey
Alexander Dey
BY
Warfield & Duell
ATTORNEYS

UNITED STATES PATENT OFFICE.

JOHN DEY AND ALEXANDER DEY, OF SYRACUSE, NEW YORK, ASSIGNORS TO DEY TIME REGISTER COMPANY, OF SYRACUSE, NEW YORK, A CORPORATION OF NEW YORK.

TIME-RECORDER.

No. 908,975.      Specification of Letters Patent.      Patented Jan. 5, 1909.

Application filed June 15, 1905.   Serial No. 265,387.

*To all whom it may concern:*

Be it known that we, JOHN DEY and ALEXANDER DEY, residing at Syracuse, in the county of Onondaga and State of New York, have invented certain new and useful Improvements in Time-Recorders, of which the following is a full, clear, and exact description, such as will enable others skilled in the art to which it appertains to make and use the same.

This invention relates to time recorders and, as regards its more specific features, to that type of time recorders in which workmen indicate upon suitable individual record cards their hours of labor.

One of the objects thereof is to provide simple and positively acting means adapted to place a record receiving member in the desired position relative to printing mechanism adapted to co-act therewith.

Another object is to provide efficient means for positively locking means of the type above mentioned so as to place beyond control of the operator the position as regards movement in one or more directions of the record receiving member.

Another object is to provide practical means for indicating at a glance the condition of those parts of a time recorder which determine the relative position of the record receiving surface and printing mechanism.

Other objects will be in part obvious and in part pointed out hereinafter.

The invention accordingly consists in the features of construction, combinations of elements, and arrangement of parts which will be exemplified in the apparatus hereinafter described, and the scope of the application of which will be indicated in the following claims.

Figure 2:
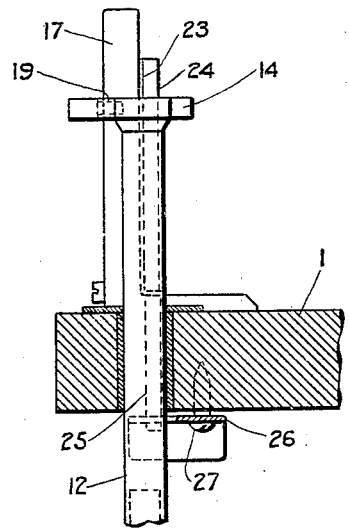
Figure 3:
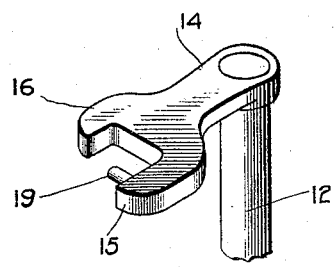
Figure 4:
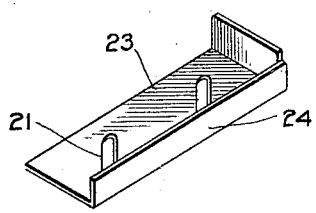
Figure 5:
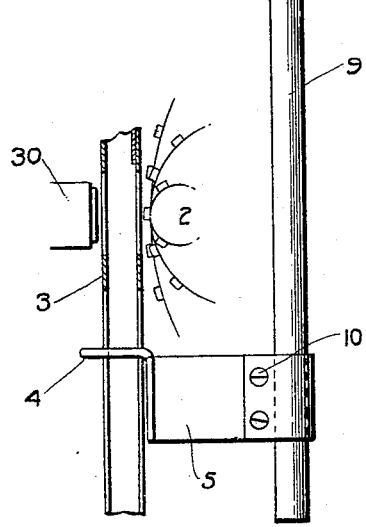
Figure 5:
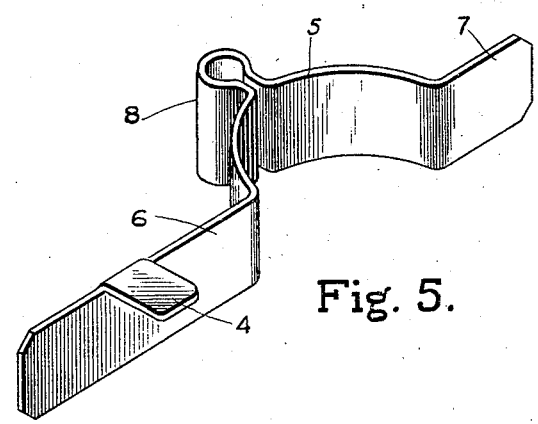
Figure 6:
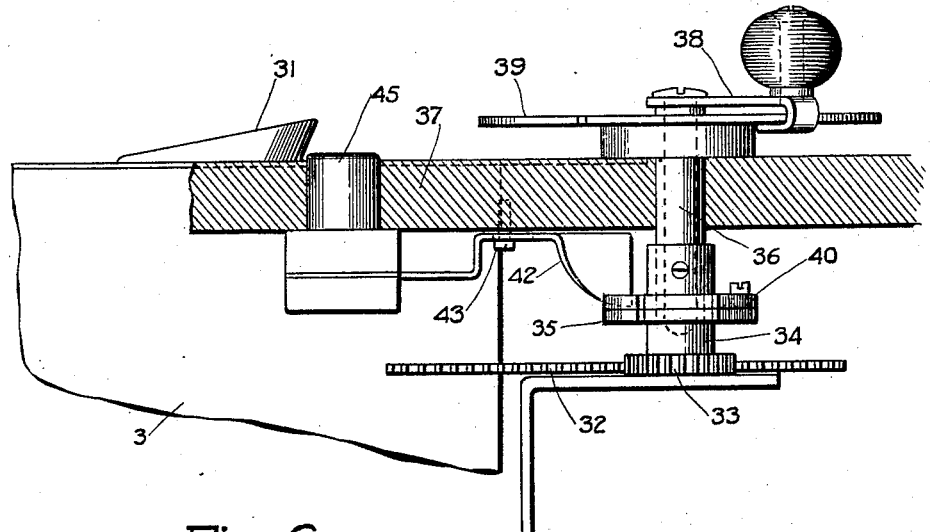
Figure 7:
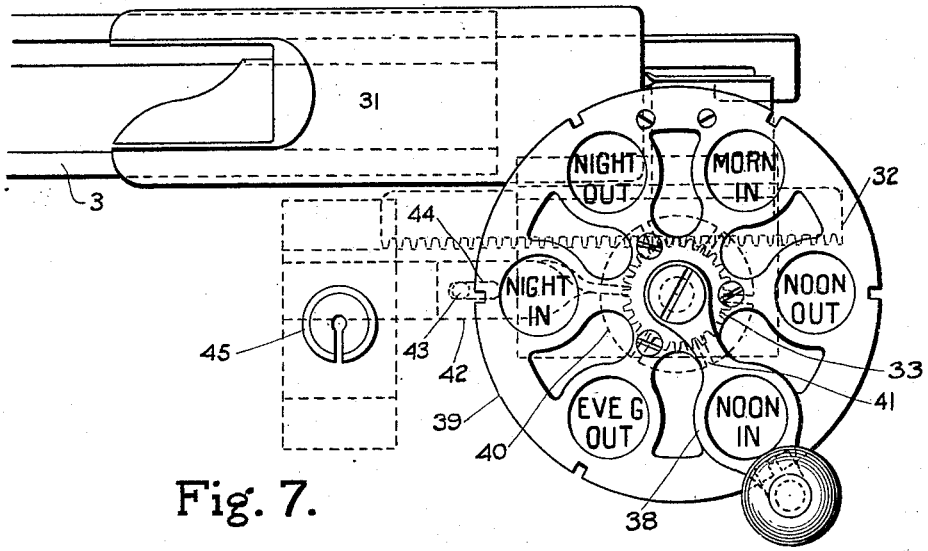

In the accompanying drawing, wherein is shown one of various possible embodiments of the several features of our invention, Figure 1 is an elevation of manually-controllable stop-positioning mechanism. Fig. 2 is a side elevation of the same. Fig. 3 is a detailed perspective view of certain parts shown in Fig. 1. Fig. 4 is a similar view of a locking slide. Fig. 5 is a similar view of a card stop with associated parts. Fig. 6 is an elevation of certain parts used in positioning the record-receiving surface, together with means for locking the same. Fig. 7 is a plan of the same.

Similar reference characters refer to similar parts throughout the several views of the drawings.

As conducing to a better understanding of certain features of our invention, it may here be noted that time recorders indicating by the position of the record upon the receiving surface the period of time within which the record is made, possess many advantages in the matters of convenience in collation of the individual records and the prevention of fraud in the formation thereof. As, in the most efficient instruments of the general type with which this invention deals, the printing mechanism is stationary, it is requisite that the receiving surface be moved relative thereto in accordance with the period of time which it is desired to indicate by the position thereon of the record printed. In order that the record may be so moved without necessitating an excessive time in the use of the instrument, or manipulation of the controlling parts, it is desirable that the mechanism determining the position of the record surface be of the simplest and most desirable construction. It may also be noted at this point that, as the period of time is indicated by position in instruments of the above type and consequently a false position would indicate a false period of time, if the workman were able by any means at his disposition to control the position of the record receiving surface, fraudulent registration might easily be accomplished. Moreover, on account of the hard use to which time recorders are subjected, either by reason of rapid manipulation of the same or intentionally forceful actuation of the parts, unless the mechanism is of the strongest and simplest construction, it will soon break down. The above and other defects are obviated in constructions of the nature of that hereinafter described.

Referring now to Fig. 1 of the drawings, there is indicated at 1 a portion of the casing of a time recorder inclosing suitably-actuated printing mechanism 2 and a card guide or receiver 3, better shown in Fig. 2 of the drawings. It may here be noted that, although this invention is peculiarly adapted for use in connection with individual record cards, nevertheless, certain features thereof are of value in connection with record-receiving members of other types. The downward movement of the card within the receiver 3 is limited by an abutment or stop 4 formed upon a strap 5 bent so as to rest in engagement with the rear surface of the card receiver, as shown at 6 and 7, and clamped, as shown at 8, about a sleeve 9, as by means of the screws 10. Sleeve 9 is slidably mounted upon a guide rod 11 and terminates at its upper end within a second sleeve 12. The meeting ends of these sleeves fit one another telescopically and are secured one to another in such manner as to permit relative rotary movement and prevent relative longitudinal movement thereof. Sleeve 12 passes through a bushing 13 in the casing 1 and, upon being raised or lowered, the stop 4 is correspondingly moved, the latter member being guided by the engagement of the strap 5 with the card receiver as above described.

Upon the upper end of sleeve 12 is fixed a locking arm 14, the free end of which comprises projecting portions 15 and 16 adapted to embrace the adjacent parts of a locking frame 17 mounted upon the casing 1. Projections 15 and 16 are so spaced one from another as normally to permit a slight rocking of the arm from a position in which the projection 16 engages the rear surface of the frame to a position in which the inner surface of projection 15 rests against the front surface thereof. The vertical position of arm 14 and, consequently, the position of stop 4 is determined by a series of perforations 18 within the locking frame 17 with which a pin 19 fixed in the inner surface of projection 15 is adapted to co-act. Pin 19 is of such length as to permit a vertical movement of the arm 14 only when the projection 16 rests against the rear surface of the locking frame. The above-described rocking movement of the arm 14 is thus permitted only when the pin 19 is opposite one of the perforations 18, which are preferably equally spaced and, in the present illustrative embodiment, are seven in number. It will thus be seen that the stop 4 is in a position determined by the particular perforation 18 within which the pin 19 rests and this stop is thus adapted to be held in any one of a number of predetermined positions by means of a proper manipulation of the locking arm 14.

Within locking frame 17 there is preferably provided an indicator 20 bearing characters adapted to denote by reason of their position relative to the several perforations 18 the time which will be indicated upon a properly formed record card when the pin 19 rests within the corresponding perforation.

As the above means may readily be manipulated so as to print a record upon any desired horizontal line of the record card, it is sometimes desirable to lock the abutment against such manipulation, and the following means are provided for that purpose: Upon the rear surface of the locking frame 17 is mounted, as by means of the inclined slots 21 and pins 22, a locking slide 23 having a flange 24 adapted, with the pin 19 in one of perforations 18 and the inner surface of projection 15 resting against the front surface of the locking frame, to fit between the rear surface of the locking frame and the projection 16 and thus prevent the pin from being swung out of the perforation within which it is positioned. Slide 23, which may be retracted by gravity or other desired means, is thrown upwardly and into locking position by means of a pin 25 slidably mounted in the casing 1. This pin normally rests upon the inclined end of a strap 26 mounted upon the lower surface of the casing, as by means of screw 27 and slot 28. A key-actuated lock 29 of any desired type is positioned within the casing, as shown in Fig. 1, and is connected with and controls the position of the strap 26 in any desired manner.

The operation of the above-described features of our invention are as follows: Assuming that it be desired that the card stop be manipulated freely by the workmen, the same is accomplished as by means of rocking the locking arm 14 until the pin 19 is free from engagement with the locking frame, then raising or depressing the arm until the end thereof is opposite the characters indicative of the period of time within which the record is to be made. The arm 14 is then rocked until the pin 19 is thrust within the corresponding perforation 18 and the record card may be inserted within receiver 3 and stamped in any desired manner, as by means of forcing the same into contact with printing wheels 2 by means of platen 30. If it be desired, however, to lock the stop or abutment 4 in a predetermined position, pin 19 is thrust within the desired opening and the lock 29 manipulated by a proper key so as to throw the pin 25 upward by reason of the action thereon of the inclined end of the strap 26. Locking slide 23 is raised and shifted laterally owing to the inclined conformation of the slots 21, so as to position the flange 24 between the projection 15 and the rear surface of the locking frame 17. Arm 14 is thus locked in position and can be released only by the use of a key co-acting with the lock 29.

As it is often desirable that the record card be shifted laterally with respect to the printing wheels, the members 31, which are adapted to engage the sides of the card and thus determine its lateral position, are provided with a rack 32 intermeshing with a pinion 33 upon a sleeve 34 which is journaled upon the frame of the instrument. Co-acting with sleeve 34 as by any desired form of detachable coupling 35, is a spindle 36 journaled within a door 37 which is hinged to the casing 1. Upon spindle 36 is fixed a crank arm 38 adapted to co-act with any desired form of indicator 39 by which the position of rack 32, and consequently of the record card, relative to the printing mechanism may be shown.

A disk 40, preferably comprising one of the members of coupling 35, is slotted about its circumference, as shown at 41, and a latch or locking slide 42 mounted upon the lower side of the door 37 as by means of screw 43 and slot 44 is adapted to be thrust within one of the slots 41 and thus lock the spindle 36 and card engaging member 31 against movement. Locking slide or latch 42 is controlled by any desired form of key-actuated lock 45 adapted to be operated by a key or equivalent member inserted therein from without the casing of the instrument.

The operation of the immediately above-described features of our invention is as follows: Assuming that it be desired that throughout a given period of time, the records be printed in a certain vertical column upon the record cards, the crank 38 is rotated until the members 31 are so disposed as to position the record cards in the desired relation to the printing mechanism 2. The parts are then locked in this position by means of the locking slide 42 which is thrust within the slot 41 opposite thereto. It will thus be seen that we have provided simple and efficient means for accomplishing the several objects of our invention and that these means are of the most practical and durable form. Our invention may be applied, moreover, to instruments now in use with slight alterations in the mechanism thereof. It will also be seen that means are provided whereby, if desired, the record receiving member may be quickly and positively thrown into any desired position with reference to the printing mechanism or the same may be locked so as to place beyond control of the user either or both of the means whereby the position of such member is changed in either a vertical or a horizontal direction.

In order to avoid the chance of ambiguity in the interpretation of terms used throughout this specification and the following claims, it may here be noted that expressions of the nature of "lateral" and "vertical" are used, in general, in a relative sense and without reference to their absolute meaning. It may also be noted that by "key-controlled" is meant a condition whereby the means so described are either actuated directly by a key or equivalent member, or such member is required in order to render this means accessible. The term "casing" is used in a broad sense to denote any form of inclosing means.

As many changes could be made in the above construction and many apparently widely different embodiments of our invention could be made without departing from the scope thereof, we intend that all matter contained in the above description or shown in the accompanying drawings shall be interpreted as illustrative and not in a limiting sense.

We desire it also to be understood that the language used in the following claims is intended to cover all of the generic and specific features of the invention herein-described and all statements of the scope of the invention, which as a matter of language, might be said to fall therebetween.

Having thus described our invention, what we claim as new, and desire to secure by Letters Patent, is:—

1. In a time recorder, in combination, a casing, printing mechanism, card engaging means, means adapted to shift said card engaging means laterally with respect to said printing mechanism, means without said casing adapted manually to actuate said shifting means, a locking member within said casing adapted to engage parts connected with said shifting means, and a lock adapted to be actuated by a key from without said casing controlling said locking member.

2. In a time recorder, in combination, a casing, printing mechanism, card engaging means, means adapted to shift laterally said card engaging means with respect to said printing mechanism, said shifting means comprising a rotatable member and a disk fixed upon said rotatable member and having slots, manually-actuated means without said casing controlling said shifting means, a slidable member within said casing adapted to be thrust within said slots and positively lock said shifting mechanism against movement in either direction, and means adapted to be actuated by a key from without said casing controlling said slidable member.

3. In a time recorder, in combination, printing mechanism, a movable abutment adapted to limit the relative movement in one direction of a co-acting record card, a casing, and a manually-controlled member directly connected with said abutment and projecting through said casing and adapted to be seized and actuated to control the position of said abutment.

4. In a time recorder, in combination, a casing, printing mechanism inclosed thereby, a movable abutment adapted to limit the relative movement in one direction of a co-acting record card, a manually-controlled member connected directly with said abutment and projecting through said casing and adapted to be seized and actuated to control the position of said abutment, and means adapted to hold said member in any one of a number of predetermined positions.

5. In a time recorder, in combination, a casing, printing mechanism inclosed thereby, a movable abutment adapted to limit the relative movement in one direction of a coacting record card, a manually-controlled member connected with and adapted to control the position of said abutment and projecting through said casing, and rocking means connected with said manually-controlled member adapted in one position to lock the same against bodily movement and in another position to permit free bodily movement thereof.

6. In a time recorder, in combination, a casing, printing mechanism inclosed thereby, a movable abutment adapted to limit the relative movement in one direction of a coacting record card, a manually-controlled member connected with and adapted to control the position of said abutment, and rocking means connected with said manually-controlled member adapted in one position to lock the same against bodily movement and in another position to permit free bodily movement thereof.

7. In a time recorder, in combination, a casing, printing mechanism inclosed thereby, a movable abutment adapted to limit the relative movement in one direction of a coacting record card, a manually controlled member connected with and controlling the position of said abutment, means connected with said member adapted to be rocked about the axis thereof, and a fixed member having irregularities in its surface, said rocking means being adapted upon being rocked into engagement with said irregularities to lock said manually-controlled member against bodily movement in either direction and upon being swung from said irregularities of said locking member to permit free bodily movement of said manually-controlled member.

8. In a time recorder, in combination, a casing, printing mechanism inclosed thereby, a movable abutment adapted to limit the relative movement in one direction of a coacting record card, a manually-controlled member connected with and controlling the position of said abutment, means connected with said member adapted to be rocked about the axis thereof, a fixed member having irregularities in its surface, said rocking means being adapted upon being thrown into engagement with said irregularities to lock said manually-controlled member against bodily movement in either direction and upon being swung free from said irregularities to permit free bodily movement of said manually-controlled member, and a visual indicator adapted to show the position of said abutment.

9. In a time recorder, in combination, a casing having a fixed member thereon, printing mechanism inclosed thereby, a movable abutment adapted to limit the relative movement in one direction of a co-acting record card relative to the printing mechanism, a manually controlled member directly connected with said abutment projecting through said casing, said member being adapted upon being reciprocated to cause a corresponding movement of said abutment, and means carried by said member movable thereon to coöperate with said fixed member on the casing to lock said manually controlled member against vertical movement.

10. In a time recorder, in combination, a casing, printing mechanism inclosed thereby, a movable abutment adapted to limit the relative movement in one direction of a coacting record card, a member directly connected with said abutment and projecting through said casing adapted upon being reciprocated to cause a corresponding movement of said abutment, and means carried by said member adapted by being swung about the axis of said member to lock the same against vertical movement.

11. In a time recorder, in combination, a casing, printing mechanism inclosed thereby, a movable abutment adapted to limit the relative movement in one direction of a coacting record card, a longitudinally movable member directly connected with said abutment and movable in either direction simultaneously therewith, said member projecting through casing and movably mounted to control the position of said abutment, a locking arm upon said member provided with a pin, and a locking frame provided with a plurality of openings, said locking arm being movably mounted to be swung so as to thrust said pin within one of said openings and lock said abutment against vertical movement in either direction.

12. In a time recorder, in combination, a casing, printing mechanism, card engaging means, manually actuated means exterior of the casing to shift said card engaging means with respect to the printing mechanism, holding means exterior to the casing and co-acting with said manually actuated means to hold the card engaging means against movement in either direction, and a key-operated lock located within the casing but accessible from the exterior thereof to lock said engaging means against movement irrespective of the condition of said holding means.

13. In a time recorder, in combination, a casing, printing mechanism inclosed thereby, a movable abutment adapted to limit the relative movement in one direction of a co-acting record card, a manually-controlled member connected with said abutment within the casing and projecting exterior to the casing and adapted to control the position of said abutment, and key-controlled means located wholly within the casing adapted to lock said manually-controlled member against movement in either direction.

14. In a time recorder, in combination, a casing, printing mechanism inclosed thereby, a movable abutment adapted to limit the relative movement in one direction of a co-acting record card, a manually-controlled member connected with said abutment and projecting through said casing adapted to control the position of said abutment, means adapted to hold said member in any one of a number of predetermined positions and key-controlled locking means located wholly within the casing and independent of the parts of said manually-controlled member exterior to the casing adapted to lock said member against movement in either direction.

15. In a time recorder, in combination, a casing having a fixed member, printing mechanism inclosed thereby, a movable abutment adapted to limit the relative movement in one direction of a co-acting record card, a reciprocatory manually controlled member connected with said abutment and projecting through said casing, adapted upon being reciprocated to control the position of said abutment, a locking member upon said manually controlled member movable into one position to engage said fixed member to hold said manually controlled member against bodily movement in either direction, and in another position out of engagement with said fixed member to permit a free bodily movement, of said manually controlled member, and means to lock said locking member in said first-named position.

16. In a time recorder, in combination, a casing, printing mechanism inclosed thereby, a movable abutment adapted to limit the relative movement in one direction of a co-acting record card, a manually-controlled member connected with said abutment and projecting through said casing adapted to control the position of said abutment, a member upon said movable member adapted in one position to hold said movable member against bodily movement in either direction, and in another position to permit a free bodily movement thereof, and key-controlled locking means adapted to lock said member in said first-mentioned position.

17. In a time recorder, in combination, a casing, printing mechanism inclosed thereby, a movable abutment adapted to limit the relative movement in one direction of a co-acting record card, a manually-controlled member connected with said abutment and projecting through said casing adapted to control the position of said abutment, a member on said movable member adapted to be rocked from one position to another, relatively fixed locking means co-acting with said rocking member adapted in one position thereof to prevent bodily movement of said movable member and in another position thereof to permit free bodily movement of said member, and key-controlled locking means adapted to lock said rocking member in said first-mentioned position.

18. In a time recorder, in combination, a casing, printing mechanism inclosed thereby, a movable abutment adapted to limit the relative movement in one direction of a co-acting record card, a manually-controlled member connected with said abutment and projecting through said casing and adapted to control the position of said abutment, a relatively fixed member, means upon said movable member adapted in one position to be thrust into engagement with said relatively fixed member to prevent bodily movement of said movable member, and in another position to permit free bodily movement thereof, and key-controlled locking means adapted to lock said means upon said movable member in said first-mentioned position.

19. In a time recorder, in combination, a casing, printing mechanism inclosed thereby, a movable abutment adapted to limit the relative movement in one direction of a co-acting record card, a manually-controlled member connected with said abutment and projecting through said casing adapted to control the position of said abutment, a relatively fixed member, a member fixed upon said movable member having two projecting portions adapted to embrace said fixed member, interlocking means upon said fixed member and one of said portions adapted upon said portion being thrust toward said fixed member to lock said movable member against bodily movement in either direction, and key-controlled locking means adapted to be thrust between said fixed member and the other of said portions to hold said interlocking means upon said first-mentioned portion and said fixed member in engagement.

20. In a time recorder, in combination, a casing, printing mechanism inclosed thereby, a movable abutment adapted to limit the relative movement in one direction of a co-acting record card, a movable member projecting through said casing and connected with said abutment adapted to control the position thereof, an arm fixed upon said movable member, a relatively fixed locking member, said arm having two portions adapted to straddle said fixed member and a pin upon one of said portions adapted to co-act with a series of openings within said fixed member, said arm being adapted upon said pin being thrust within one of said openings to prevent bodily movement of said movable member, and means adapted to be thrust between the other of said portions and said fixed member to hold said pin within the opening wherein it is positioned.

21. In a time recorder, in combination, a casing, printing mechanism inclosed thereby, a movable abutment adapted to limit the relative movement in one direction of a coacting record card, a movable member projecting through said casing and connected with said abutment adapted to control the position thereof, an arm fixed upon said movable member, a relatively fixed locking member, said arm having two portions adapted to straddle said fixed member, a pin upon one of said portions adapted to co-act with a series of openings within said fixed member, said arm being adapted upon said pin being thrust within one of said openings to prevent bodily movement of said movable member, means adapted to be thrust between the other of said portions and said fixed member to hold said pin within the opening wherein it is positioned, and key-controlled locking means controlling said last-mentioned means.

22. In a time recorder, in combination, a casing, printing mechanism inclosed thereby, a movable abutment adapted to limit the relative movement in one direction of a coacting record card, a member connected with said abutment and projecting through said casing adapted to control the position of said abutment, a relatively fixed locking member, an arm upon said movable member having portions straddling said fixed member, one of said portions being adapted upon being thrust toward said fixed member to interlock therewith and lock said movable member against bodily movement in either direction, and slidable means mounted upon said fixed member adapted to be thrust between the same and the other of said portions to hold said interlocking means in engagement.

23. In a time recorder, in combination, a casing, printing mechanism inclosed thereby, a movable abutment adapted to limit the relative movement in one direction of a coacting record card, a member connected with said abutment and projecting through said casing adapted to control the position of said abutment, a relatively fixed locking member, an arm upon said movable member having portions straddling said fixed member, one of said portions being adapted upon being thrust toward said fixed member to interlock therewith and lock said movable member against bodily movement in either direction, means mounted upon said fixed member and having a sliding connection therewith adapted to be thrown between the same and the other of said portions and hold said interlocking means in engagement, a pin projecting through said casing and controlling the position of said last-mentioned means, and key-controlled means controlling the position of said pin.

24. In a time recorder, in combination, a casing, printing mechanism inclosed thereby, a movable abutment adapted to limit the relative movement in one direction of a coacting record card, a member connected with said abutment and projecting through said casing adapted to control the position of said abutment, a relatively fixed locking member, an arm upon said movable member having portions straddling said fixed member, one of said portions being adapted upon being thrust toward said fixed member to interlock therewith and lock said movable member against bodily movement in either direction, a locking plate mounted upon said fixed member, said locking plate being provided with inclined slots and having pins projecting through said slot within said fixed member, a pin projecting through said casing and controlling the position of said locking plate, a member having an inclined surface engaging said pin and adapted upon movement to throw said locking plate between said fixed member and the other of said portions of said arm to hold said locking means in engagement, and key-actuated means adapted to be controlled from without said casing adapted to move said member having said inclined surface and throw said locking plate into operative position.

In testimony whereof we affix our signatures, in the presence of two witnesses.

JOHN DEY.
ALEXANDER DEY.

Witnesses:
  CLARA SACKETT RAYMOND,
  F. P. WARFIELD.